Oct. 10, 1933.   C. W. CROES   1,930,307
MAP HOLDER
Filed May 19, 1930
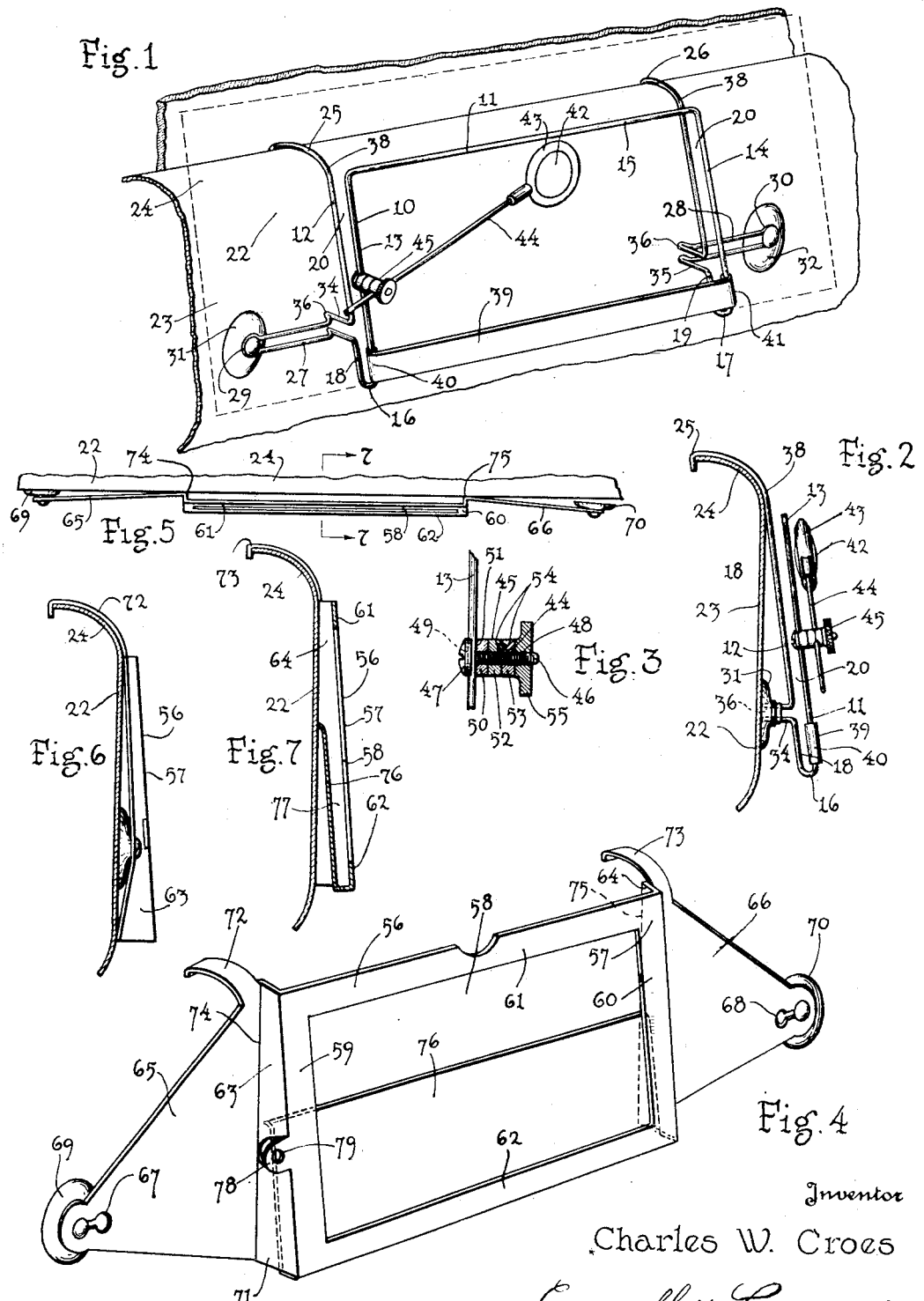
Inventor
Charles W. Croes
By Caswell & Lagaard
Attorneys Patented Oct. 10, 1933

1,930,307

UNITED STATES PATENT OFFICE 1,930,307

MAP HOLDER

Charles W. Croes, Aberdeen, S. Dak.

Application May 19, 1930. Serial No. 453,616

10 Claims. (Cl. 40—10)

My invention relates to map holders and has for its object to provide a map holder which may be readily attached to a horizontal surface such as the windows, windshield, cowl, or other portions of the body of a motor vehicle, where the same may be readily viewed by the user.

Another object of the invention resides in providing attaching means for said holder of a nature such that the holder may be quickly and securely attached to the structure on which the same is to be mounted.

A feature of the invention resides in constructing the holder in a manner that the same may be attached to the surface on which it is to be mounted in tilted or inclined relation thereto so as to be more readily visible by the observer.

A still further object of the invention resides in constructing the holder with a frame for supporting the map, and in attaching to said frame wing-like members adapted to support suction cups for attaching the device to the surface on which the same is to be mounted.

Another object of the invention resides in constructing the frame with portions adapted to contact with the surface on which the holder is to be mounted, and to further dispose said suction cups normally out of the plane of the surface on which the holder is to be mounted so as to force the contacting portions of said holder in contact with said surface when said suction cups are applied thereto.

A feature of the invention resides in constructing said wing-like members of resilient material.

An object of the invention resides in constructing said wing-like members and the contacting portions of said frame integral with said frame.

Another object of the invention resides in forming at the upper portions of said frame hooks adapted to hook over the object on which the holder is to be mounted for further supporting the holder upon the object on which it is to be mounted.

A still further object of the invention resides in constructing the frame of said holder with a front and with a back integrally connected therewith and bent up from the lower portion of said front to leave the holder open at the top for the reception of the map or maps to be carried thereby.

A feature of the invention resides in constructing said wing-like portions offset from said frame to cause the frame to tilt when applied to the surface on which it is to be mounted.

An object of the invention resides in providing means for supporting a magnifying glass in adjusted position over the face of the frame.

Other objects of the invention reside in the novel combination and arrangement of parts and in the details of construction hereinafter illustrated and/or described.

In the drawing:

Fig. 1 is a perspective view of a map holder applied to the cowl of a motor vehicle and illustrating an embodiment of my invention.

Fig. 2 is an end elevational view of the structure shown in Fig. 1 and illustrating the cowl in cross section.

Fig. 3 is a sectional detail view of the attaching device for the magnifying glass.

Fig. 4 is a perspective view of a modification of the structure shown in Fig. 1.

Fig. 5 is a plan view of the structure shown in Fig. 4 and illustrating the device mounted on the cowl of a motor vehicle.

Fig. 6 is an end elevational view of the structure shown in Figs. 4 and 5 and illustrating the cowl in cross section.

Fig. 7 is a cross sectional view taken on line 7—7 of Fig. 5.

In driving motor vehicles, it is frequently desirable to consult maps for the purpose of ascertaining the desired course. Toward this end, numerous map holders have been designed for holding maps so as to enable the operator to observe the same. Such devices, however, have not held the map with sufficient rigidity to permit of removing and replacing of the maps without dislocating the holder. In addition, such devices have not held the maps at the proper angle to permit of readily viewing the said maps. The instant invention overcomes these difficulties by providing a map holder which may be rigidly and firmly attached to the structure on which it is to be mounted and which may be supported in a tilted manner to readily present the maps to the view of the observer.

The form of the invention shown in Fig. 1 is constructed principally of wire of a semi-resilient character which is bent to form the various parts thereof. The holder comprises a frame indicated in its entirety at 10 which consists of a front 11 and a back 12. The front 11 is of U-shaped formation and consists of two side members 13 and 14 connected together through a transverse member 15. At the lower portion of the frame 10, the side members 13 and 14 are bent back upon themselves as indicated at 16 and 17 to form complemental side members 18 and 19 which form a part of the back 12. The side members 18 and 19 lie parallel with the side members 13 and 14 to provide a space 20 therebetween open at the top to receive and retain the maps. With the form of the invention shown in Fig. 1, I prefer to use a large map printed on paper which may be folded to present the particular portion of the map desired to be viewed. The folded map structure may be bodily inserted in the space 20 through the open end thereof and may project outwardly beyond the front 11 of the frame 10 at both sides and the top thereof as indicated in dotted lines at 21 in Fig. 1.

The frame 10 as previously stated is adapted to be attached to the cowl or any other similar structure of a motor vehicle. For the purpose of illustration, a portion 22 of the cowl of a motor vehicle has been shown which is constructed with a planiform surface 23 and with an upper curved portion 24 connected therewith. For attaching the holder to the cowl 22, the extreme ends of the side members 18 and 19 of the back 12 of frame 10 are formed with hooks 25 and 26 which are bent out of the plane of said map holder and are adapted to hook about the extreme edge of the portion 24 of said cowl as best shown in Fig. 2. In addition to these hooks, the side members 18 and 19 have bent outwardly therefrom wing portions 27 and 28 which are offset from the plane of the eside members 18 and 19 and which terminate in loops 29 and 30 by means of which suction cups 31 and 32 may be attached to the same in the usual manner. The suction cups 31 and 32 are adapted to be applied to the surface 23 of the cowl 22 in the ordinary manner and when so attached serve in conjunction with the hooks 25 and 26 to rigidly support the map holder in a manner to prevent disengagement of the same from the cowl when maps are inserted into the map holder or the position thereof changed with respect to the same.

To permit the observer to more readily view the maps the map holder is tilted as clearly shown in the drawing. This is accomplished by constructing the wing members 27 and 28 offset with respect to the frame 10 and by constructing the same with legs 34 and 35 which hold the lower portion of the frame outwardly from the cowl. These legs are formed with heels 36 which directly engage the surface of the cowl and which bring the loops 29 and 30 of said wing members away from the plane of surface 23. As previously stated, the material from which the device is constructed is preferably semi-resilient. The wing members 27 and 28 are so constructed that the contacting surfaces of the suction cups 31 and 32 lie normally out of the plane of the heels 36 of the legs 34 and 35 before the device is attached to the surface on which it is to be mounted. When the suction cups are forced into engagement with the surface 23, the resiliency of the wing members 27 and 28 causes the heels 36 to bear against said surface thereby holding the frame 10 rigidly and firmly attached to the cowl. As will be noted in Fig. 2, the upper portions 38 of the side members 18 and 19 of the back 12 contact with the upper portion of cowl 22 to cause the device to tilt as desired and at the same time assist in holding the holder firmly attached to the cowl.

For the purpose of stiffening the lower portion of the frame 10 a band of sheet metal 39 may be employed which has the ends 40 and 41 thereof looped about the lower portions of the side members 13 and 14. This band may also serve to receive advertising or other descriptive matter which it is desired to place upon the holder.

In conjunction with the map holder, I employ a magnifying glass 42 which may be adjustably positioned to overlie any desired portion of the map so that the user may readily observe the portion of the map beneath the same. This magnifying glass is carried by a ring 43 which is attached to a rod 44. The rod 44 is adjustably mounted in a post indicated in its entirety at 45 which is shown in detail in Fig. 3. The post 45 comprises a screw 46 which is formed with a head 47 and a shank 48. The head 47 is constructed with a groove 49 extending across the same which is adapted to receive the side member 13 of the frame 10. A washer 50 disposed on the shank 48 and on the other side of said side member and formed with a complemental groove 51 serves to clamp the post to said side member. In a similar manner two other washers 52 and 53 are placed upon the shank 48 which are constructed with complemental grooves 54 adapted to receive the rod 44 which carries the magnifying glass 42. Upon the extreme end of the shank 48 of the screw 46 is a thumb nut 55 by means of which the various parts may be rigidly clamped together to hold the same in adjusted position. Upon loosening the screw 55 the post 45 may be slid relative to the side member 13 and the rod 44 slid relative to said post and oscillated with respect thereto. Through these various adjustments, the magnifying glass 43 may be positioned over any particular part of the map carried by the holder proper so that the user may readily view the same and so that the user's eye may be readily directed to the portion of the map in which he is particularly interested.

In the use of the device, the holder is applied to the cowl by merely hooking the hooks 25 and 26 over the upper portion thereof. The suction cups 31 and 32 which have previously been moistened are next pressed against the surafce 23 of the cowl which brings the heels 36 of the legs 34 and 35 in contact with the surface of the cowl thereby rigidly and firmly holding the holder mounted in proper position. The maps may next be folded in the desired manner to expose the particular portion thereof which the user desires to observe. The map is then inserted edgewise into the space 20 between the front 11 and back 12 of the frame structure 10 until the lower edge thereof engages the bends 16 and 17 of said frame structure. The magnifying glass 42 may then be adjusted to cover the particular spot in which the operator is particularly interested. When so disposed, the operator may readily glance down upon the map while driving the vehicle and readily and quickly observe the portion thereof in which he is interested. This may be accomplished momentarily and without stopping the vehicle so that the observer may procure the desired information without inconvenience.

In Figs. 4, 5, 6 and 7 I have shown another form of the invention in which the entire frame structure is constructed of sheet metal instead of wire. In this form of the invention the frame which is indicated at 56 is constructed with a front 57 having an opening 58 therein forming a window through which the maps may be viewed. By means of the opening 58 the front 57 is formed with stiles 59 and 60 connected by rails 61 and 62. Bent outwardly from the stiles 59 and 60 of the frame structure 56 are side members 63 and 64 which are constructed as best illustrated in Figs. 4 and 7. These side members have wing members 65 and 66 bent outwardly therefrom which are formed with openings 67 and 68 for the reception of suction cups 69 and 70 similar to the suction cups 31 and 32 of the other form of the invention. It will be noted that the side members 63 and 64 are so constructed that the same are considerably wider at the lower portions 71 thereof so that when the device is applied to the surface of the object on which it is to be mounted the front 57 of the frame 56 inclines or tilts in the same manner as the frame of the other form of the invention.

In addition to the suction cups 69 and 70 for attaching the device to the surface on which it is to be mounted, the wing portions 65 and 66 are provided with hooks 72 and 73 which correspond to the hooks 25 and 26 of the other form of the invention. These hooks are adapted to be hooked over the portion 24 of the cowl 22 in identically the same manner and assist in holding the holder attached to the cowl.

The metal from which the form of the invention shown in Fig. 4 is constructed is preferably of a semi-resilient nature so that a certain amount of resiliency may be had in the wing members 65 and 66. These members are normally bent out of the plane of the corners 74 and 75 formed between said wing members and the side members 63 and 64. Due to this construction, the suction cups 69 and 70 when applied to the surface on which the device is to be mounted causes the said corners 74 and 75 to firmly seat against said surface so as to hold the device rigidly attached to the cowl or other object on which it is to be mounted. It will hence become apparent that the device shown in Fig. 4 may be attached to the cowl in identically the same manner as that shown in Fig. 1 so that the maps mounted in the frame 56 will be equally as firmly supported as those mounted in the frame 10.

For the purpose of supporting the maps, the rail 62 of the frame 56 has bent upwardly therefrom a back 76 which is spaced from the front 57 of said frame to leave a pocket 77 therebetween for the reception of the maps. The maps with this form of the invention must be folded to a size such that the same may be received between the side members 63 and 64 of the frame 56 or maps of the exact size as said frame may be used and slid into place and retained within the pocket 77.

For supporting the magnifying glass 42, the stile 59 of the front 57 is formed with an ear 78 which is struck out of the metal of the side member 63. This ear is provided with an opening 79 adapted to receive the shank 48 of the screw 46. When the parts are assembled upon the ear 78 the magnifying glass 42 may be shifted about to cover any portion of the window 58 in practically the same manner as when applied to the device shown in Fig. 1.

The use of the device illustrated in Fig. 4 is exactly the same as that illustrated in Fig. 1. The holder is applied to the object on which it is to be mounted by hooking the hooks 72 and 73 over the upper edge of the same. The suction cups 69 and 70 are next forced into engagement with the surface on which the holder rests and the map or maps inserted into the pocket 77. The magnifying glass 42 may then be adjusted by loosening the screw 55 after which the magnifying glass may be moved to any desired position and secured in place by tightening said screw.

Although the metal from which either the device shown in Fig. 1 or that shown in Fig. 4 is constructed is preferably of a resilient nature, the same is preferably constructed of material which may be readily bent by the operator. Where the device is to be applied to different surfaces, the hooks 25 and 26 of the form of the invention shown in Fig. 4 may be bent to fit more accurately about the upper end of the cowl, window pane, or object on which the device is to be mounted. In this manner, the upper portion of the frame in either form of the invention can be made to fit tight against the surface to which the device is applied so that rattling or vibration of the device is entirely prevented.

My invention is highly advantageous in that an extremely simple and effective device is provided for holding maps where the same may be readily viewed by the drivers of motor vehicles. The device can be constructed at a nominal cost and will not readily get out of order. The device may be firmly and rigidly attached to the surface on which it is to be mounted so that the maps may be applied thereto or removed therefrom without danger of loosening the device or of altering its position with respect to the object on which it is mounted. Due to the resiliency of the parts used in the construction of the device, the same is held to the surface on which it is mounted in such a manner as to prevent rattling or vibration of the same. By constructing the holder so that the same tilts relative to the surface to which it is applied, the maps are more readily visible to the observer. By means of the magnifying glass employed, the observer's attention may be more readily directed to any particular spot on the map and the same more easily viewed.

Changes in the specific form of my invention, as herein described, may be made within the scope of what is claimed without departing from the spirit of my invention.

Having described my invention what I claim as new and desire to protect by Letters Patent is:

1. A map holder comprising a frame for supporting a map, wing members issuing outwardly from the sides of said frame, the ends of said wing members being movable toward and from the plane of said frame, means on said frame for contacting with the surface on which the map holder is to be mounted, and suction cups on said wing members adapted to be attached to the surface on which the map holder is to be mounted and serving to force the contacting portions of said frame against said surface.

2. A map holder comprising a frame for supporting a map, wing members issuing outwardly from the sides of said frame, said wing members being constructed of resilient material, suction cups attached to said wing members, said frame having portions thereof adapted to engage the surface on which the map holder is to be mounted, said suction cups being normally disposed out of the plane on which the surface of the map holder is to be mounted and being adapted upon attachment to said surface to force the contacting portions of said frame against said surface.

3. A map holder comprising a frame, means at one locality on said frame for attaching said frame to the surface on which it is to be mounted, means at another locality on said frame for further attaching said frame to the surface on which it is to be mounted, the contacting part of one of said means being spaced farther from said frame than the other to cause said frame to tilt relative to said surface.

4. A map holder comprising a frame, hooks formed at the upper portion of the frame and integral therewith for attaching the frame to the object on which the map holder is to be mounted, suction cups at another locality on said frame for further attaching the map holder to the object on which it is to be mounted, said hooks being disposed to restrain movement of the frame along the surface of the object to which the suction cups are applied.

5. A map holder comprising a frame, hooks formed at the upper portion of said frame and integral therewith, wing members integral with said frame and issuing outwardly therefrom, and suction cups attached to said wing members, said hooks extending away from the planes of said wing members.

6. A map holder comprising a frame for supporting a map, wing members issuing outwardly from the sides of said frame, the ends of said wing members being movable toward and from the plane of said frame, means on said frame for contacting with the surface on which the map holder is to be mounted and means on said wing members for engagement with the object on which the map holder is to be mounted, said means serving to force the contacting means on said frame against said surface.

7. A map holder comprising a frame formed from wire having a front and a back, said front and back both having side members bent in continuation of one another and spaced to form a pocket for the reception of the map, the side members of said back having portions bent out of line therewith and attaching means secured to the bent portions of said side members.

8. A map holder comprising a frame formed from wire having a front and a back, said front and back both having side members bent in continuation of one another and spaced to form a pocket for the reception of the map, the side members of said back having portions bent out of line therewith, attaching means secured to the bent portions of said side members and hooks formed on the extreme ends of the side members of the back.

9. A map holder comprising a frame, means at one locality on said frame for attaching said frame to the surface on which it is to be mounted, means at another locality on said frame for engagement with the surface on which the map holder is mounted to determine the position thereof, one of said means being more remotely disposed from said frame than the other to cause the frame to tilt relative to said surface.

10. A map holder comprising a frame, hooks formed at the upper portion of said frame and integral therewith, said frame having portions adjacent said hooks adapted to contact with the surface on which the frame is to be mounted and to be held in engagement therewith through said hooks, wing members integral with said frame and issuing outwardly therefrom, said wing members being offset from the plane of said frame and having portions adapted to hold the frame at one locality spaced from the surface on which the frame is mounted to cause the map holder to tilt relative to said surface, and suction cups attached to said wing members for holding said portions thereof in engagement with said surface.

CHARLES W. CROES.